United States Patent

Sacripante et al.

Patent Number: 5,401,601
Date of Patent: Mar. 28, 1995

[54] POLYESTERAMIDE-SILOXANE TONER AND DEVELOPER COMPOSITIONS

[75] Inventors: Guerino G. Sacripante, Oakville; T. Brian McAneney, Burlington, both of Canada

[73] Assignee: Xerox Corporation, Stamford, Conn.

[21] Appl. No.: 113,112

[22] Filed: Aug. 30, 1993

[51] Int. Cl.$^6$ ................ G03G 9/087; G03G 9/097
[52] U.S. Cl. ................ 430/106.6; 430/109; 430/110; 430/126; 430/904
[58] Field of Search ........... 430/109, 904, 110, 106.6, 430/126

[56] References Cited

U.S. PATENT DOCUMENTS

| | | | |
|---|---|---|---|
| 3,590,000 | 6/1971 | Palermiti et al. | 252/62.1 |
| 3,983,045 | 9/1976 | Jugle et al. | 252/62.1 |
| 4,560,635 | 12/1985 | Hoffend et al. | 430/106.6 |
| 4,601,966 | 7/1986 | Grashof et al. | 430/109 |
| 4,758,491 | 7/1988 | Alexandrovich et al. | 430/109 |
| 4,954,408 | 9/1990 | Georges | 430/108 |
| 5,223,368 | 6/1993 | Ciccarelli et al. | 430/110 |
| 5,250,996 | 10/1993 | Sugizaki et al. | 430/109 |

*Primary Examiner*—Christopher D. Rodee
*Attorney, Agent, or Firm*—E. O. Palazzo

[57] ABSTRACT

A toner composition comprised of pigment, an optional charge enhancing additive and a polyesteramide-siloxane resin of the following Formulas I, II or III

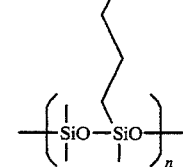

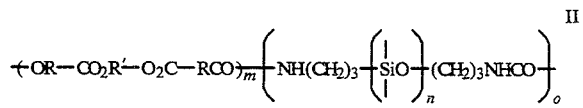

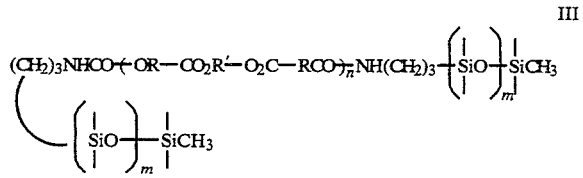

wherein m, n and o represent the number of monomer segments present; R is independently selected from the group consisting of aryl and alkyl; and R' is independently selected from the group consisting of alkyl, alkylene and oxyalkylene.

19 Claims, No Drawings

POLYESTERAMIDE-SILOXANE TONER AND DEVELOPER COMPOSITIONS

BACKGROUND OF THE INVENTION

This invention is generally directed to toner and developer compositions, and more specifically, the present invention is directed to developer and toner compositions containing a polyesteramide-siloxane resin, and processes for the preparation thereof. In embodiments, there are provided in accordance with the present invention, toner compositions comprised of certain polyester-siloxane resins, charge controlling agents and pigment parities comprised of, for example, carbon black, magnetites, or mixtures thereof, cyan, magenta, yellow, blue, green, red, brown components, or mixtures thereof thereby providing for the development and generation of black and/or colored images. In embodiments, there are provided in accordance with the present invention a polyesteramidesiloxane resin, as illustrated by the following formulas I,II and III.

I

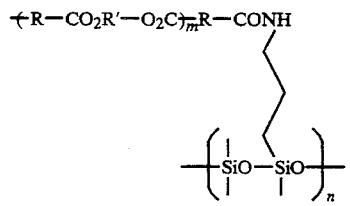

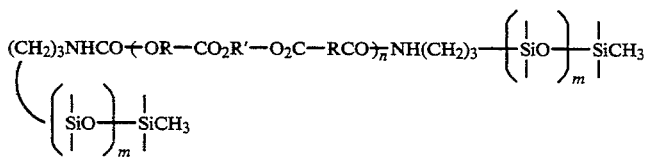

II

III wherein R is an aryl with, for example, 6 to about 30 carbon atoms, such as phenyl, naphthyl, benzyl, terephthaloyl, isophthaloyl or alkyl; R' is an alkyl group with, for example, 1 to about 25 carbon atoms, an alkylene, such as for example with from 1 to about 25 carbon atoms like ethylene, propylene, butylene, and the like, or an alkylene oxide with, for example, 1 to about 25 carbon atoms, such as diethylene oxide, triethyleneoxide, polyoxypropylene, mixtures thereof, and the like; and m, n and o represent the number of monomer segments. The toner compositions of the present invention in embodiments possess a number of advantages including oilless characteristics, that is the ability of a toner not to offset onto the fuser rolls with minimal, or preferably no release agents present on the fuser rolls. Additionally, in embodiments the toner compositions of the present invention possess low melting properties, excellent blocking characteristics, excellent admix characteristics, excellent nonvinyl offset properties, and low relative humidity sensitivity such as from about 1.01 to about 2.3. The toner compositions of the present invention can in embodiments be generated by a process involving the melt polycondensation of about 1 mole equivalent of diacid or diester, such as terephthalic acid or dimethylterephthalate, with from about 0.95 to 2 moles of glycol, such as 1,2-propylene glycol, diethylene glycol mixtures thereof and the like, and from about 0.01 to about 0.2 mole equivalent of an γ-aminoalkyl siloxane such as illustrated by the formulas that follow immediately

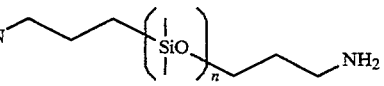

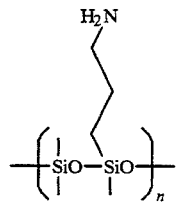

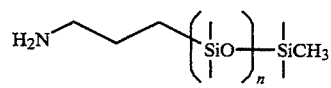

wherein n represents the number of repeating segments, and is, for example, a number of from about 10 to about 1,000.

The polyesteramide-siloxane exhibits, for example, a number average molecular weight of from about 1,500 to about 50,000 grams per mole as measured by vapor pressure osmomotery, and a glass transition temperature of from about 40° C. to about 80° C., and more preferably from about 50° C. to about 65° C. as measured by a Differential Scanning Calorimeter.

Examples of specific advantages of the toner composition of the present invention comprised of polyesteramide-siloxanes, include oilless characteristics, that is for example there can be avoided the utilization of release agents on the fuser oils, or only minimal use of release agents on the fuser roll is selected, such as from about 0.1 percent to about 50 percent of the release agents, depending on the type of fuser used. Other advantageous include low fusing temperatures, such as from about 120° C. to about 140° C., and therefore lower fusing energies are required for fixing, thus enabling less power consumption during fusing, and permitting extended lifetimes for the fuser system selected. Furthermore, the toner compositions of this invention possess in embodiments a broad fusing latitude, such as from about 40° C. to about 100° C., with minimal or avoidance of release oil, which inhibits the toner from offsetting onto the fuser rollers usually associated with ghosting or background images on subsequent copies. Moreover, the fused image obtained from the toner composition of the present invention in embodiments does not substantially offset to vinyl covers, such as those utilized for notebook binders, and possess a low humidity sensitivity ratio of from about 1 to about 2.3 as calculated by the ratio of the triboelectric charge (in microcoulombs per gram) of the developer after being placed in a chamber of 20 percent humidity for 48 hours to the triboelectric charge (in microcoulombs per gram) of the developer after being placed in a chamber of 80 percent humidity for 48 hours.

In designing resins for toner composition, it is generally desired that the glass transition temperature of the resin be from about 50° C. to about 65°, and preferably no less than about 55° C. so that, for example, the toner particles do not aggregate, coalesce or block during manufacturing, transport or storage, or until the toner is needed for fixing. Moreover, low relative humidity sensitivity of toners are desired such that the triboelectric charge is stable to changes in environmental humidity conditions. Copiers and printers equipped with pressure fuser rolls normally employ release agents, such as silicone oil and the like, to prevent the toner from offsetting on the rolls during the transfix step. Toner offset onto the fuser rolls can cause ghosting and image deterioration on subsequent copies and such offset also reduces the lifetime of the fuser. Therefore, especially with xerographic copiers and printers utilizing pressure fixing rollers, release agents, such as silicone oils, are replenished regularly since some of the oil transfers onto the paper during transfix and is lost. There is a need for fuser rolls which do not necessitate the use of release agents, such as silicone oil on the fuser rolls, hence reducing the need of silicone oil and replenishing mechanism thereof, thereby reducing the cost of such equipment. With the toners of the present invention, such fuser release agents, specifically agents like an γ-alkylaminosiloxane oil is minimized or avoided as the toner will not usually offset onto the fuser rolls during the transfix step. This is accomplished, in the present invention in embodiments, by providing an oilless toner wherein the resin is comprised of a polesteramide-siloxane material. Moreover, the toner of the present invention displays other advantages as indicated herein, such as low fixing temperatures of from about 120° C. to about 140° C., high gloss such as from about 50 gloss units to about 80 gloss units, nonvinyl offset properties, and low relative humidity sensitivity such as from about 1.01 to about 2.5. These and other advantages are attained by the toner compositions of this invention, which compositions are comprised of a pigment, optionally a charge control agent, a polyesteramide-siloxane resin derived from a polyester and alkylaminosiloxane, and optional known toner additives, which toner exhibits ramless features such as the reduced need of fuser release agents of from about 0 to about 50 percent, low fixing temperature of from about 120° C. to about 140° C., high gloss such as from about 50 gloss units to about 80 gloss units, nonvinyl offset properties and low relative sensitivity such as from about 1.0 to about 2.3.

Polyesteramide resins are known, reference in U.S. Pat. No. 4,601,966, which discloses toner and developer compositions with an amorphous, random polyesteramide containing amide linkages in the polymer backbone, and is derived from certain dicarboxylic acids, compounds containing primary amino groups and compounds containing hydroxyl groups, however, polyesteramide-siloxane resins are not disclosed and also the polyesteramide of this reference is comprised of ester and amide linkages throughout the backbone of the resin. Furthermore, the '966 patent does not disclose the advantages of oilless or low humidity sensitivity. In the present invention, in embodiments there are provided toners comprised of polyesteramide-siloxane resins wherein a polyester segment is linked by an amido moiety to a siloxane moiety, and wherein oilless features are attained accompanied by low relative humidity sensitivity, and thus differs, for example, from the '966 patent wherein a siloxane release oil is not chemically linked to the polyesteramide resin for oilless functionality. In U.S. Pat. No. 4,954,408, the disclosure of which is totally incorporated herein by reference, there is disclosed a toner composition comprised of a pigment, charge control agent and a styrene-butadiene-siloxane resin. The toner composition of the '408 invention mentions advantages, such as oilless characteristics, however, the toners of the '408 patent display fixing temperatures of from about 140° C. to about 160° C., and are believed to be inferior for low melt applications wherein low fixing temperatures of from about 120° C. to about 145° C., and wherein high gloss of from about 40 to about 80 gloss units are desired. Furthermore, the siloxane portion is linked via a carbon-carbon bond and no amide linkages are present in the resins of the '408 patent. This differs from the present invention wherein the siloxane linked to the polyester resin is a γ-alkylaminosiloxane forming an amide linkage. With the toner of the present invention, the preferred silicone oil in embodiments is chemically linked to a toner resin such as a polyester. Furthermore, with the toner of the present invention in embodiments, a low fixing temperature of from about 120° C. to about 145° C., and high gloss of from about 40 to about 80 gloss units are attained, and which gloss is not believed to be attainable with the toner resin of the '408 patent.

Specifically, in one embodiment, the present invention relates to a toner composition comprised of a pigment, charge control agent and polyesteramide-siloxane resins as illustrated with reference to formula 1 with low fixing of from about 120° C. to about 140° C., high gloss such as from about 50 gloss units to about 80 gloss units as measured by the Garner Gloss metering unit, nonvinyl offset properties, and in addition low relative humidity sensitivity such as from about 1.0 to about 2.3, and ramless characteristics such as a reduction of from about 50 percent to about 100 percent of release agents used for fuser rolls.

SUMMARY OF THE INVENTION

It is an object of the present invention to provide toner and developer compositions with many of the advantages illustrated herein.

In another object of the present invention there are provided toner compositions with polyesteramide-siloxane resins, and which toners are useful for the development of electrostatic latent images including color images.

In yet another object of the present invention there are provided processes for the preparation of polyesteramide-siloxane resins.

Moreover, in another object of the present invention that are provided toner compositions comprised of polyesteramide-siloxane resins with low melt fusing temperatures of from about 130° C. to about 145° C.

In yet another object of the present invention that are provided toner compositions comprised of polyesteramide-siloxane resins, which reduces the use of release fluids on fuser rolls in electrophotographic imaging systems of from about 50 percent to about 100 percent.

Moreover, in another object of the present invention that are provided toner compositions comprised of polyesteramide-siloxane resins with low melt fusing temperatures of from about 130° C. to about 145° C. and broad fusing latitude of from about 40° C. to about 100° C.

Moreover, in another object of the present invention that are provided toner compositions comprised of polyesteramide-siloxane resins, and with a glass transition temperature of from about 50° C. to about 65° C.

In yet another object of the present invention that are provided toner compositions comprised of polyesteramide-siloxane resins with a number average molecular weight of from about 1,500 grams per mole to about 100,000 gram per mole as measured by GPC.

In yet in another object of the present invention there are provided developer compositions comprised of a toner which displays high projection efficiency on transparency, such as from about 60 to about 99 percent projection using a Match Scan II spectrophotometer available from Diana.

Moreover, it is an object of the present invention to provide a toner which displays high gloss such as from about 30 to about 80 gloss units as measured by the Gardner Gloss metering unit.

Additionally, it is an object of the present invention to provide a toner which displays low relative sensitivity such as from about 1.0 to about 2.3 as measured from the triboelectric charge ratio of 20 percent humidity to 80 percent humidity.

Another object of the present invention resides in the formation of toners which will enable the development of images in electrophotographic imaging and printing apparatuses, which images have substantially no background deposits thereon, are substantially smudge proof or smudge resistant, and, therefore, are of excellent resolution; and further, such toner compositions can be selected for high speed electrophotographic apparatuses, that is those exceeding 70 copies per minute.

Also, in another object of the present invention there are provided developer compositions comprised of toner and carrier particles.

These and other objects of the present invention can be accomplished in embodiments thereof by providing toner compositions comprised of polyesteramide-siloxanes of the formulas as illustrated herein, reference I,II and III, charge controlling agents, pigment particles, and optional known toner additives.

The polyesteramide-siloxane resins of the present invention can be prepared as illustrated herein, and more specifically by charging a reactor, equipped with a bottom drain valve, double turbine agitator and distillation receiver with a cold water condenser with from about 0.95 to about 1.05 mole of a diester, such as dimethylterephthalate, of from about 0.01 to about 0.2 mole of an aminoalkylsiloxane resin, such as bis(3-aminopropyl)siloxane, aminoalkylsiloxanes, Shin-Etsu Silicone available from Shin-Etsu Chemical Company, of from about 0.60 to about 2.05 mole of a diol such as an alkane diol like 1,2-propanediol and from about 0.01 to about 0.40 of a second diol such as diethylene glycol, and from about 0.001 to about 0.02 mole of catalyst such as a tetraalkyl like tetrabutyl titanate. The reactor is then heated to from about 150° C. to about 187° C. with stirring for a duration of from about 3 hours to about 20 hours, and whereby 0.5 to about 1 mole of alcohol byproduct, such as methanol, is collected in the distillation receiver comprised of from about 90 percent to about 100 percent by volume of methanol and from about 0 percent by volume to about 20 percent by volume of 1,2-propanediol as measured by an ABBE refractometer available from American Optical Corporation. The mixture is then heated at from about 180° to about 210° C., after which the pressure is slowly reduced over a period of from about 10 minutes to about 3 hours to from about 100 Torr to about 300 Torr, and then reduced to from about 0.01 Tort to about 5 Torr over a period of from about one hour to about 5 hours with collection of approximately 0.5 to about 2 mole of distillate in the distillation receiver comprised of approximately 90 percent by volume to about 100 percent by volume of an aliphatic diol like 1,2-propanediol and from about 0, and preferably 0.1 percent by volume to about 10 percent by volume of an aliphatic alcohol like methanol as measured by the ABBE refractometer. The reactor is then purged with nitrogen to atmospheric pressure, and the resulting polymer is comprised of the appropriate polyesteramide-siloxane or, more specifically, copoly(1,2-propylene-diethylene-terephthalate)-copoly-(3'-aminopropylsiloxane). The aforementioned polyesteramide-siloxane resin is then discharged through the bottom drain onto a container cooled with dry ice. The glass transition temperature of the resin can then be measured and is from about 50 to about 65° C. (onset) measured utilizing the 910 Differential Scanning Calorimeter available from DuPont operating at a heating rate of 10° C. per minute. The number average molecular weight can be measured and is from about 1,500 grams per mole to about 30,000 grams per mole, and the weight average molecular weight was measured to be from about 6,000 grams per mole to about 50,000 grams using tetrahydrofuran as the solvent, and using the 700 Satelite WISP gel permeation chromatograph available from Waters Company equipped with a styrogel column. About 1.8 grams of the poly(1,2-propylene-diethylene-terephthalate) resin obtained is then pressed into a pellet of about 1 centimeter in diameter and from about 2 to about 3 centimeters in length utilizing the Shimadzu CFT-500 equipped with a die with an orifice opening of 1 millimeter by 1 millimeter in diameter subjected to a 20 killigrams/cm$^2$ load and heated from 20° C. to 130° C. at a rate of 10° C. per minute. The polyesteramidesiloxane resin can then be measured to display a softening point of from about 70° C. to about 83° C., a beginning of flow temperature $T_1$ of from about 80° C. to about 92° C., and flow temperature $T_2$ of from about 15° C. to about 30° C. higher than $T_1$. Process embodiments include the melt esterification of a diacid or dialkylester with a diol or mixture of diols, a γ-aminoalkyldimethylsiloxane and a catalyst, wherein the diacid or diester is selected from the group consisting of malonic acid, succinic acid, 2-methylsuccinic acid, 2,3-dimethylsuccinic acid, dodecylsuccinic acid, glutaric acid, adipic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, alkyl esters; wherein the alkyl groups are of 1 carbon chain to 23 carbon chains and are esters of malonate, succinate, 2-methyl succinate 2,3-dimethylsuccinate, dodecylsuccinate, glutarate, adipic acid, 2-methyladipate, pimelate, azeilate, sebacate acid, terephthalate, isophthalate, phthalate, 1,2-cyclohexanedioate, 1,3-cyclohexanedioate, 1,4-cyclohexanedioate, and mixtures thereof; and which diesters are employed in effective amounts of from about 45 to about 55 mole percent by weight of the resin; the diol, which can contain up to about 30 carbon atoms, is selected from the group consisting of ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decalyne glycol, dodecylyne glycol, 2,2-dimethyl propanediol, propoxylated bisphenol A, ethoxylated bisphenol A, 1,4-cyclohexanediol, 1,3-cyclohexanediol, 1,2-cyclohexanediol, 1,2-cyclohexane dimethanol, 2-propanediol, and mixtures thereof; and which glycols are employed in various effective amounts of from about 45 to about 55 mole percent by weight of the resin; and the catalyst is selected from the group consisting of tetraalkyl titanates, dialkyltin oxide, tetraalkyltin, dialkyltin oxide hydroxide, aluminum alkoxides, alkyl zinc, dialkyl zinc, zinc oxide, stannous oxide, dibutyltin oxide, butyltin oxide hydroxide, tetraalkyl, and mixtures thereof; and wherein said catalyst is selected in effective amounts of from about 0.01 mole percent to about 1 mole percent of resin. Alkyl contains, for example, from 1 to about 25, and preferably 15 carbon atoms.

Specific examples of polyesteramide-siloxane resins of the present invention include copoly(1,2-propylene-diethylene-terephthalate)copoly-(3'-aminopropylsiloxane), copoly(1,2-propylene-terephthalate)copoly-(3'-aminopropylsiloxane), copoly(1,2-propylene-ethyleneterephthalate)-copoly-(3'-aminopropylsiloxane), copoly(1,2-propylenediethylene-terephthalate)-copoly-(3'-aminopropylsiloxane), copoly(1,2-propylene-bisphenol A-fumarate)-copoly-(3'-aminopropylsiloxane), copoly(1,2-propylene-1,4-cyclohexane-terephthalate)-copoly-(3'-aminopropylsiloxane), copoly(1,2-propylene-1,4-cyclohexanedimethanoltereph thalate)-copoly-(3'-aminopropylsiloxane), poly(1,2-propylene-diethylene-terephthalate)-g-γ-amidosiloxane, poly(1,2-propyleneethylene-terephthalate)-g-γ-amidosiloxane, poly(1,2-propylene-hexyleneterephthalate)-g-γ-amidosiloxane, poly(1,2-propylene-1,4-cyclohexaneterephthalate)-g-γ-amidosiloxane, poly(1,2-propylene-bisphenol A-fumarate)-g-γ-amidosiloxane, bis(3-amidopropylsiloxy)-poly(1,2-propyleneethylene-terephthalate), bis(3-amidopropylsiloxy)-poly(1,2-propyleneterephthalate), bis(3-amidopropylsiloxy)-poly(1,2-propylene-diethyleneterephthalate), bis(3-amidopropylsiloxy)-poly(1,2-propylene-bisphenol A-fumarate), mixtures thereof and the like, which resin is present in the toner in various effective amounts, such as from about 70 to about 98 percent by weight, and preferably from about 80 to about 95 percent by weight of the toner comprised of, for example, resin and pigment, and wherein the $M_n$ of the resin is from about 1,500 to about 50,000, the $M_w$ is from about 3,000 to about 300,000 and the polydispersity ($M_w/M_n$) is from about 1.2 to about 10 in embodiments.

Specific examples of diols utilized in preparing the aforementioned polyesteramide-siloxane include ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycol, octylene glycol, decalyne glycol, dodecylyne glycol, 2,2-dimethyl propanediol, propoxylated bisphenol A, ethoxylated bisphenol A, 1,4-cyclohexanediol, 1,3-cyclohexanediol, 1,2-cyclohexanediol, 1,2-cyclohexane dimethanol, 2-propanediol, mixtures thereof, and the like; and which diols are employed in various effective amounts, such as for example from about 40, and preferably about 45 to about 55 mole percent by weight of the toner resin of Formula I.

Specific examples of diacids or anhydrides utilized in preparing the aforementioned polyesteramide-siloxane include malonic acid, succinic acid, 2-methyl succinic acid, 2,3-dimethylsuccinic acid, dodecylsuccinic acid, glutaric acid, adipic acid, 2-methyladipic acid, pimelic acid, azeilic acid sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, mixture thereof, and the like; and which components are employed, for example, in amounts of from about 45 to about 55 mole percent by weight of the toner resin.

Specific examples of diesters utilized in preparing the aforementioned polyesteramide-siloxane include alkyl esters, wherein the alkyl groups contain from 1 carbon to about 23 carbons, esters of malonate, succinate, 2-methylsuccinate 2,3-dimethylsuccinate, dodecylsuccinate, glutarate, adipic acid, 2-methyladipate, pimelate, azeilate, sebacate acid, terephthalate, isophthalate, phthalate, 1,2-cyclohexanedioate, 1,3-cyclohexanedioate, 1,4-cyclohexanedioate, mixtures thereof, and the like, and which diesters are employed in various effective amounts of, for example, from about 45 to about 55 mole percent by weight of the toner resin.

Specific examples of aminoalkylsiloxanes utilized in preparing the aforementioned polyesteramide-siloxane include bis(3-aminopropyl)siloxane, bis(2-aminoethyl)-siloxane, bis(4-aminobutyl)-siloxane, 3-aminopropyl-siloxane, 2-aminoethyl-siloxane, 4-aminobutyl-siloxane, γ-aminoalkyl siloxane, copoly(dimethylsiloxane)-copoly(γ-aminopropyldimethylsiloxane), mixtures thereof and the like; and which aminoalkylsiloxanes are employed in effective amounts of, for example, from about 0.1 to about 15 mole percent by weight of the resin, and which have a number average molecular weight of from about 1,500 grams per mole to about 300,000 grams per mole as measured by GPC.

Specific examples of polycondensation catalysts that can be selected for the processes of the present invention include tetraalkyl titanates, dialkyltin oxide, tetraalkyltin, dialkyltin oxide hydroxide, aluminum alkoxides, alkyl zinc, dialkyl zinc, zinc oxide, stannous oxide, dibutyltin oxide, butyltin oxide hydroxide, tetraalkyl tin such as dibutyltin dilaurate, and mixtures thereof; and which catalysts can be selected or employed in various effective amounts of, for example, from about 0.01 mole percent to about 1 mole percent of the toner resin.

Various known colorants or pigments present in the toner in an effective amount of, for example, from about 1 to about 25 percent by weight of toner, and preferably in an amount of from about 1 to about 15 weight percent that can be selected include carbon black like REGAL 330®; magnetites such as Mobay magnetites MO8029 TM, MO8060 TM; Columbian magnetites; MAPICO BLACKS TM and surface treated magnetites; Pfizer magnetites CB4799 TM, CB5300 TM, CB5600 TM, MCX6369 TM; Bayer magnetites BAYFERROX 8600 TM, 8610 TM; Northern Pigments magnetites NP-604 TM, NP-608 TM; Magnox magnetites TMB-100 TM or TMB-104 TM. As colored pigments, there can be selected known cyan, magenta, yellow, red, green, brown, blue or mixtures thereof. Specific examples of pigments include HELIOGEN BLUE L6900 TM, D6840 TM, D7080 TM, D7020 TM, PYLAM OIL BLUE TM and PYLAM OIL YELLOW TM, PIGMENT BLUE 1 TM available from Paul Uhlich & Company, Inc., PIGMENT VIOLET 1 TM, PIGMENT RED 48 TM, LEMON CHROME YELLOW DCC 1026 TM, E. D. TOLUIDINE RED TM and BON RED C TM available from Dominion Color Corporation, Ltd., Toronto, Ontario, NOVAperm YELLOW FGL TM, HOSTAPERM PINK E TM from Hoechst, and CINQUASIA MAGENTA TM available from E. I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK TM, and cyan components may also be used as pigments. The pigments can generally be selected in various effective amounts of, for example, from about 1 weight percent to about 65 weight percent of the toner.

The toner may also include in effective amounts, such as from about 0.1 to about 10 weight percent, and preferably 5 weight percent, known charge additives such as alkyl pyridinium halides, bisulfates, the charge control additives of U.S. Pat. Nos. 3,944,493; 4,007,293; 4,079,014; 4,394,430, and 4,560,635, which illustrates a toner with a distearyl dimethyl ammonium methyl sulfate charge additive, the disclosures of which are totally incorporated herein by reference, negative charge additives like aluminum complexes such as BONTRON E-88 TM available from Orient Chemicals, the charge additives of U.S. Pat. No. 5,223,368 (D/90404), the disclosure of which is totally incorporated herein by reference, and the like.

Surface additives in effective amounts, such as from about 0.1 to about 3 weight percent, that can be added to the toner compositions of the present invention include, for example, metal salts, metal salts of fatty acids, colloidal silicas, mixtures thereof and the like, reference U.S. Pat. Nos. 3,590,000; 3,720,617; 3,655,374 and 3,983,045, the disclosures of which are totally incorporated herein by reference. Preferred additives include zinc stearate and AEROSILS®, such as AEROSIL R972® available from Degussa.

In another embodiment of the present invention, there i s provided subsequent to known micronization and classification toner particles with an average volume diameter as determined by a Coulter Counter of from about 5 to about 20 microns average volume diameter The polyesteramide-siloxane resin is present in a sufficient, but effective amount, for example generally from about 70 to about 98 weight percent. Thus, when 1 percent by weight of the charge enhancing additive is present, and about 8 percent by weight of pigment or colorant, such as carbon black, is contained therein, and then about 91 percent by weight of resin is selected. Also, the charge enhancing additive of the present invention may be coated on the pigment particles.

The toner and developer compositions of the present invention may be selected for use in electrostatographic imaging apparatuses containing therein conventional photoreceptors providing that they are capable of being charged negatively. Thus, the toner and developer compositions of the present invention can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Latent images are formed on the photoreceptor, developed with the toner of the present invention, transferred to paper, and fixed thereto.

Developer compositions of the present invention are comprised of the toners illustrated herein and carrier particles of, for example, iron, steel, ferrites, and the like, coated or uncoated, reference for example U.S. Pat. Nos. 4,937,166; 4,935,326, and also 4,904,762 and 4,937,157, the disclosures of which are totally incorporated herein by reference.

The following Examples are being provided to further define various species of the present invention, it being noted that these Examples are intended to illustrate and not limit the scope of the present invention. Parts and percentages are by weight unless otherwise indicated.

EXAMPLE I

Copoly(1,2-propylene-terephthalate)-copoly(γ-aminopropyl-dimethylsiloxane) Resin Derived From 1,2-Propylene Glycol, Dimethylterephthalate, and 1 Percent by Resin Weight of Copoly(γ-aminopropyldimethylsiloxy)copoly(dimethylsiloxane):

A one liter Parr reactor equipped with a bottom drain valve, double turbine agitator and distillation receiver with a cold water condenser was charged with 375 grams of dimethylterephthalate, 296.9 grams of 1,2-propanediol (1 mole excess), 4.3 grams of copoly(γ-aminopropyldimethylsiloxy)-copoly(dimethylsiloxane) available as Shin-Etsu Silicone from 5Shin-Etsu Chemical Company (1 percent by weight of polyesteramide-siloxane resin product), and 0.8 gram of tetrabutyl titanate as the catalyst. The reactor was then heated to 165° C. with stirring for 16 hours whereby 110 grams of distillate was collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 125 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer product discharged through the bottom drain onto a container cooled with dry ice to yield 410 grams of the polyesteramide-siloxane comprised of copoly(1,2-propylene-terephthalate)-copoly(γ-aminopropyl-dimethylsiloxane) resin. The resin product glass transition temperature was then measured to be 62° C. (onset) utilizing a 910 Differential Scanning Calorimeter available from E. I. DuPont operating at a heating rate of 10° C. per minute. The resin number average molecular weight was measured to be 4,200 grams per mole and the weight average molecular weight was measured to be 11,200 grams per mole using tetrahydrofuran as the solvent and the 700 Satelite WISP gel permeation chromatograph available from Waters Company equipped with a styrogel column. 1.8 Grams of the resin product were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$ load and wherein the barrel temperature was heated from 20° C. to 130° C. at a rate of 10° C. per minute. For the resin product of this Example, a softening point of 83° C., beginning of flow temperature $T_1$ of 92° C., and flow temperature $T_2$ of 104° C. were obtained.

EXAMPLE II

Copoly(1,2-propylene-diethylene terephthalate)-copoly(γ-aminopropyldimethyl-siloxane) Resin Derived. From 1,2-Propylene Glycol, Diethylene Glycol, Dimethylterephthalate, and 1 Percent by Resin Weight of Copoly(γ-aminopropyldimethylsiloxy)-copoly(dimethylsiloxane):

A one liter Parr reactor equipped with a bottom drain valve, double turbine agitator and distillation receiver with a cold water condenser was charged with 375 grams of dimethylterephthalate, 272 grams of 1,2-propanediol (1 mole excess), 30.8 grams of diethylene glycol, 4.3 grams of copoly(γ-aminopropyldimethylsiloxy)copoly(dimethylsiloxane) available as Shin-Etsu Silicone from Shin-Etsu Chemical Company (1 percent by weight of polesteramide-siloxane resin product), and 0.8 gram of tetrabutyl titanate as the catalyst. The reactor was then heated to 165° C. with stirring for 16 hours whereby 111 grams of distillate were collected in the distillation receiver, which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 120 grams of distillate in the distillation receiver comprised of approximately 97 percent by volume of 1,2-propanediol and 3 percent by volume of methanol as measured by the ABBE refractometer. The pressure was then further reduced to about 1 Tort over a 30 minute period whereby an additional 18 grams of 1,2-propanediol were collected. The reactor was then purged with nitrogen to atmospheric pressure, and the polymer discharged through the bottom drain onto a container cooled with dry ice to yield 410 grams of the polyester-amide-siloxane product of copoly(1,2-propylene-diethylene-terephthalate)-copoly(γ-aminopropyl-dimethylsiloxane). The resin product glass transition temperature was then measured to be 61° C. (onset) utilizing the 910 Differential Scanning Calorimeter available from E. I. DuPont operating at a heating rate of 10° C. per minute. The resin product number average molecular weight was measured with the 700 Satelite WISP gel permeation chromatograph available from Waters Company equipped with a styrogel column to be 4,100 grams per mole and the weight average molecular weight was measured to be 10,700 grams per mole using tetrahydrofuran as the solvent. 1.8 Grams of the product resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$ load and wherein the barrel temperature was heated from 20° C. to 130° C. at a rate of 10° C. per minute. For the resin of this Example, a softening point of 82° C., beginning of flow temperature $T_1$ of 91° C., and flow temperature $T_2$ of 104° C. were measured.

EXAMPLE III

Copoly(1,2-propylene-diethylene terephthalate)-Copoly(γ-aminopropyldimethyl-siloxane) Resin Derived From 1,2-Propylene Glycol, Diethylene Glycol; Dimethylterephthalate, and 2 Percent by Weight of Copoly(γ-aminopropyldimethylsiloxy)-copoly(dimethylsiloxane):

A one liter Parr reactor equipped with a bottom drain valve, double turbine agitator and distillation receiver with a cold water condenser was charged with 375 grams of dimethylterephthalate, 272 grams of 1,2-propanediol (1 mole excess), 30.8 grams of diethylene glycol, 8.6 grams of copoly(γ-aminopropyldimethylsiloxy)copoly(dimethylsiloxane) available as Shin-Etsu Silicone from Shin-Etsu Chemical Company (2 percent by weight of the polyesteramide-siloxane resin product), and 0.8 gram of tetrabutyl titanate as the catalyst. The reactor was then heated to 165° C. with stirring for 16 hours whereby 110 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 15 grams of 1,2-propanediol were collected. The reactor was then purged with nitrogen to atmospheric pressure, and the polymer product was discharged through the bottom drain onto a container cooled with dry ice to yield 408 grams of the polyesteramide-siloxane comprised of copoly(1,2-propylene-diethyleneterephthalate)-copoly(γ-aminopropyl-dimethyl-siloxane). The resin product glass transition temperature was then measured to be 60° C. (onset) utilizing the 910 Differential scanning Calorimeter available from E. I. DuPont operating at a heating rate of 10° C. per minute. The resin product number average molecular weight was measured to be 3,900 grams per mole and the weight average molecular weight was measured to be 8,900 grams per mole using tetrahydrofuran as the solvent and the 700 Satelite WISP gel permeation chromatograph available from Waters Company equipped with a styrogel column. 1.8 Grams of this resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$ load and wherein the barrel temperature was heated from 20° C. to 130° C. at a rate of 10° C. per minute. For the product resin of this Example, a softening point of 79° C., beginning of flow temperature $T_1$ of 90° C., and flow temperature $T_2$ of 102° C. were obtained.

EXAMPLE IV

Copoly(1,2-propylene-diethylene terephthalate)-copoly(γ-aminopropyldimethyl-siloxane) Resin Derived From 1,2-Propylene Glycol, Diethylene Glycol, Dimethylterephthalate, and 5 Percent by Weight of Copoly(γ-aminopropyldimethylsiloxy)-copoly(dimethylsiloxane):

A one liter Parr reactor equipped with a bottom drain valve, double turbine agitator and distillation receiver with a cold water condenser was charged with 375 grams of dimethylterephthalate, 272 grams of 1,2-propanediol (1 mole excess), 30.8 grams of diethylene glycol, 21.5 grams of copoly(γ-aminopropyldimethylsiloxy)copoly(dimethylsiloxane) available as Shin-Etsu Silicone from Shin-Etsu Chemical Company (5 percent by weight of the polyesteramide-siloxane resin), and 0.8 gram of tetrabutyl titanate as the catalyst. The reactor was then heated to 165° C. with stirring for 16 hours whereby 110 grams of distillate were collected in the distillation receiver, comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 125 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 14 grams of 1,2-propanediol were collected. The reactor was then purged with nitrogen to atmospheric pressure, and the polymer product was discharged through the bottom drain onto a container cooled with dry ice to yield 418 grams of the polyesteramide-siloxane of copoly(1,2-propylene-diethyleneterephthalate)-copoly(γ-aminopropyl-dimethyl-siloxane). The product resin glass transition temperature was then measured to be 64° C. (onset) utilizing the 910 Differential Scanning Calorimeter available from E. I. DuPont operating at a heating rate of 10° C. per minute. The product resin number average molecular weight was measured to be 4,900 grams per mole and the weight average molecular weight was measured to be 11,300 grams per mole using tetrahydrofuran as the solvent and the 700 Satelite WISP gel permeation chromatograph available from Waters Company equipped with a styrogel column. 1.8 Grams of this resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$ load and wherein the barrel temperature was heated from 20° C. to 130° C. at a rate of 10° C. per minute. For the resin of this Example, a softening point of 78° C., beginning of flow temperature $T_1$ of 94° C., and flow temperature $T_2$ of 107° C. were obtained.

EXAMPLE V

Copoly(1,2-propylene-terephthalate)-copoly(γ-aminopropyl-dimethylsiloxane) Resin Derived From 1,2-Propylene Glycol, Dimethylterephthalate, and 1 Percent by Resin Weight of Bis(3-aminopropyl)-dimethylsiloxane with $M_w$ of 1,500:

A one liter Parr reactor equipped with a bottom drain valve, double turbine agitator and distillation receiver with a cold water condenser was charged with 375 grams of dimethylterephthalate, 296.9 grams of 1,2-propanediol (1 mole excess), 4.3 grams of bis(3-aminopropyl)dimethylsiloxane displaying a weight average molecular weight of 1,500 grams per mole and available from Huls Chemical Company (1 percent by weight of the polyesteramide-siloxane resin), and 0.8 gram of tetrabutyl titanate as the catalyst. The reactor was then heated to 165° C. with stirring for 16 hours whereby 109 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 121 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer product was discharged through the bottom drain onto a container cooled with dry ice to yield 412 grams of the polyesteramide-siloxane of copoly(1,2-propylene-terephthalate)-copoly(3-aminopropyl-dimethylsiloxane). The resin glass transition temperature was then measured to be 60° C. (onset) utilizing the 910 Differential Scanning Calorimeter available from E. I. DuPont operating at a heating rate of 10° C. per minute. The product resin number average molecular weight was measured to be 5,200 grams per mole and the weight average molecular weight was measured to be 11,300 grams per mole using tetrahydrofuran as the solvent and the 700 Satelite WISP gel permeation chromatograph available from Waters Company equipped with a styrogel column. 1.8 Grams of this resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm² load and a barrel temperature heated from 20° C. to 130° C. at a rate of 10° C. per minute. For the resin of this Example, a softening point of 76° C., beginning of flow temperature $T_1$ of 88° C., and flow temperature $T_2$ of 100° C. were obtained.

EXAMPLE VI

Copoly(1,2-propylene-terephthalate)-copoly( -aminopropyl-dimethylsiloxane) Resin Derived From 1,2-Propylene Glycol, Diethylene Glycol, Dimethylterephthalate, and 2 Percent by Resin Weight of Bis(3-aminopropyl)-dimethylsiloxane with $M_w$ of 1,500:

A one liter Parr reactor equipped with a bottom drain valve, double turbine agitator and distillation receiver with a cold water condenser was charged with 375 grams of dimethylterephthalate, 272 grams of 1,2-propanediol (1 mole excess), 30.8 grams of diethylene glycol, 8.6 grams of bis(3-aminopropyl)-dimethylsiloxane displaying a weight average molecular weight of 1,500 grams per mole and available from Huls Chemical Company (2 percent by weight of the polyesteramide-siloxane resin), and 0.8 gram of tetrabutyl titanate as the catalyst. The reactor was then heated to 165° C. with stirring for 16 hours whereby 109 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced over a one hour period to about 260 Torr, and then reduced to 5 Torr over a two hour period with the collection of approximately 121 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 18 grams of 1,2-propanediol were collected. The reactor was then purged with nitrogen to atmospheric pressure, and the polymer product was discharged through the bottom drain onto a container cooled with dry ice to yield 412 grams of the polyesteramide-siloxane comprised of copoly(1,2-propylene-diethylene-terephthalate)-copoly(3-aminopropyl-dimethylsiloxane). The resin glass transition temperature was then measured to be 57° C. (onset) utilizing the 910 Differential Scanning Calorimeter available from E. I. DuPont operating at a heating rate of 10° C. per minute. The product resin number average molecular weight was measured to be 5,100 grams per mole and the weight average molecular weight was measured to be 10,700 grams per mole using tetrahydrofuran as the solvent and the 700 Satelite WISP gel permeation chromatograph available from Waters Company equipped with a styrogel column. 1.8 Grams of this resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions with a 20 killigrams/cm² load and a barrel temperature heated from 20° C. to 130° C. at a rate of 10° C. per minute. For the resin product of this Example, a softening point of 74° C., beginning of flow temperature $T_1$ of 84° C., and flow temperature $T_2$ of 98° C. were obtained.

EXAMPLE VII

A toner composition comprised of 98 percent by weight of the polyesteramide-siloxane of Example II, and 2 percent by weight of PV FAST BLUE ™ pigment was prepared as follows.

The polyesteramide-siloxane of Example II was in the form of a large chunk. The resulting polymer was ground to smaller particles in a Model J Fitzmill equipped with an 850 micrometer screen. After grinding, 392 grams (98 percent by weight of toner) of the polymer polyesteramidesiloxane of Example II was mixed with 8 grams of PV FAST BLUE ™ pigment (2 percent by weight of toner) available from Hoechst Chemical Corporation. The two components were dry blended first on a paint shaker and then on a roll mill. A small DAVO ™ counter rotating twin screw extruder was then used to melt mix the aforementioned mixture. A K-Tron twin screw volumetric feeder was used to feed the mixture to the extruder with a barrel temperature of 120° C., and a screw rotational speed of 60 rpm at a feed rate of 10 grams per minute. The extruded strands were broken into coarse particles by passing them through a Model J Fitzmill twice, the first time with an 850 micrometer screen, and the second time with a 425 micrometer screen. An 8 inch Sturtevant micronizer was used to reduce the particle size further. After grinding, the toner was measured to display an average volume diameter particle size of 7.0 microns with a geometric distribution of 1.37 as measured by the Coulter Counter. A developer composition was prepared by roll milling the aforementioned toner, 3 parts by weight with 100 parts by weight of carrier, about 90 microns in diameter comprised of a steel core with polyvinylidene fluoride polymer coating available from Xerox Corporation, 1.25 weight percent thereof. The aforementioned developer was incorporated into a 20 percent humidity chamber for 24 hours, and the charge measured by the known blow-off Faraday Cage apparatus, followed by subjecting the developer to an 80 percent humidity chamber for 24 hours, and then measuring the charge. The relative humidity sensitivity of this toner was then calculated as the ratio of the charges obtained in the 20 percent and 80 percent humidity chamber, and found to be 2.15. Unfused copies were then produced with the above toner with a Xerox Corporation 1075 imaging apparatus with the fusing system disabled. The unfused copies were then subsequently fused on a customized laboratory test fuser using a process speed of 160 millimeters per second. Fusing evaluation of the toner indicated a minimum fixing temperature of about 137° C., a hot-offset temperature of about 200° C., and a gloss level of 50 as measured by the Gardner gloss metering unit at a temperature of about 143° C. The oil rate utilized was 17 milligrams per sheet of paper.

EXAMPLE VIII

A toner composition comprised of 98 percent by weight of the polyesteramide-siloxane polymer of Example II, and 2 percent by weight of PV FAST BLUE ™ pigment was prepared as follows.

The polyesteramide-siloxane of Example II, was in the form of a large chunk. The resulting polymer was ground to smaller particles in a Model J Fitzmill equipped with an 850 micrometer screen. After grinding, 392 grams (98 percent by weight of toner) of polymer were mixed with 8 grams of PV FAST BLUE ™ pigment (2 percent by weight of toner) available from Hoechst Chemical Corporation. The two components were dry blended first on a paint shaker and then on a roll mill. A small DAVO ™ counter rotating twin screw extruder was then used to melt mix the aforementioned mixture. A K-Tron twin screw volumetric feeder was used to feed the mixture to the extruder with a barrel temperature of 120° C., and a screw rotational speed of 60 rpm at a feed rate of 10 grams per minute. The extruded strands were broken into coarse particles by passing them through a Model J Fitzmill twice, the first time with an 850 micrometer screen, and the second time with a 425 micrometer screen. An 8 inch Sturtevant micronizer was used to reduce the particle size further. After grinding, the toner was measured to display an average volume diameter particle size of 7.0 microns with a geometric distribution of 1.37 as measured by the Coulter Counter. A developer composition was prepared by roll milling the aforementioned toner, 3 parts by weight with 100 parts by weight of carrier comprised of a steel core with polyvinylidene fluoride polymers (KYNAR ©) coating thereof. The aforementioned developer was subjected to a 20 percent humidity chamber for 24 hours, followed by measuring the charge by the known blow-off Faraday Cage apparatus, followed by subjecting the developer in a 80 percent humidity chamber for 24 hours, and then measuring the charge (tribo charge). The relative humidity sensitivity of this toner was then calculated as the ratio of the charges obtained in the 20 percent and 80 percent humidity chamber, and found to be 2.2. Unfused copies were then produced with the above toner in a Xerox Corporation 1075 imaging apparatus with the fusing system disabled. The unfused copies were then subsequently fused on a customized laboratory test fuser using a process speed of 80 millimeters per second. Fusing evaluation of the toner indicated a minimum fixing temperature of about 119° C., a hot-offset temperature of about 170° C., and a gloss level of 50 as measured by the Gardner gloss metering unit at a temperature of about 126° C. The oil rate utilized was about 12 milligrams per sheet of paper.

COMPARATIVE EXAMPLE IX

A toner composition comprised of 98 percent by weight of a polyester without siloxane-amide incorporation, and 2 percent by weight of PV FAST BLUE ™ pigment was prepared as follows.

A polyester resin derived from 375 grams of dimethylterephthalate, 272 grams of 1,2-propanediol (1 mole excess), 30.8 grams of diethylene glycol,and 0.8 gram of tetrabutyl titanate as the catalyst was prepared. The reactor containing the aforementioned components was then heated to 165° C. with stirring for 16 hours whereby 111 grams of distillate were prepared using the procedure of Example II. The resin glass transition temperature was then measured to be 61° C. (onset) utilizing the 910 Differential Scanning Calorimeter available from E. I. DuPont operating at a heating rate of 10° C. per minute. The number average molecular weight was measured to be 3,900 grams per mole and the weight average molecular weight was measured to be 9,200 grams per mole using tetrahydrofuran as the solvent and the 700 Satelite WISP gel permeation chromatograph available from Waters Company equipped with a styrogel column. 1.8 Grams of this resin were then pressed into a pellet of about 1 centimeter in diameter and about 10 centimeters in length using the press and die set supplied by Shimadzu with the Flowtester 500 series. The pressed sample pellet was then loaded in the flowtester and subjected to the standard Shimadzu conditions using 20 killigrams/cm$^2$ load and a barrel temperature heated from 20° C. to 130° C. at a rate of 10° C. per minute. For the resin of this Example, a softening point of 82° C., beginning of flow temperature $T_1$ of 91° C., and flow temperature $T_2$ of 104° C. were obtained. The polyester of this Example displays thermal properties substantially similar to the polyesteramidesiloxane resin of Example II. The resulting polymer was ground to smaller particles in a Model J Fitzmill equipped with an 850 micrometer screen. After grinding, 392 grams (98 percent by weight of toner) of polymer was mixed with 8 grams of PV FAST BLUE ™ pigment (2 percent by weight of toner) available from Hoechst Chemical Corporation. The two components were dry blended first on a paint shaker and then on a roll mill. A small DAVO ™ counter rotating twin screw extruder was then used to melt mix the aforementioned mixture. A K-Tron twin screw volumetric feeder was used to feed the mixture to the extruder with a barrel temperature of 120° C., and a screw rotational speed of 60 rpm at a feed rate of 10 grams per minute. The extruded strands were broken into coarse particles by passing through a Model J Fitzmill twice, the first time with an 850 micrometer screen, and the second time with a 425 micrometer screen. An 8 inch Sturtevant micronizer was used to reduce the particle size further. After grinding, the toner was measured to display an average volume diameter particle size of 7.0 microns with a geometric distribution of 1.37 as measured by the Coulter Counter. A developer composition was prepared by roll milling the aforementioned toner, 3 parts by weight with 100 parts by weight of carrier comprised of a steel core with a polyvinylidene fluoride polymer coating thereof, 1.25 weight percent. The aforementioned developer was subjected to a 20 percent humidity chamber for 24 hours, followed by measuring the charge by the known blow-off Faraday Cage apparatus, followed by subjecting the developer in a 80 percent humidity chamber for 24 hours, and then measuring the charge. The relative humidity sensitivity of this toner was then calculated as the ratio of the charges obtained in the 20 percent and 80 percent humidity chamber, and found to be 2.3. Unfused copies were then produced with the above toner using a Xerox Corporation 1075 imaging apparatus with the fusing system disabled. The unfused copies were then subsequently fused on a customized laboratory test fuser using a process speed of 80 millimeters per second. Fusing evaluation of the toner indicated a minimum fixing temperature of about 121° C., a hot-offset temperature of about 160° C., and a gloss level of 50 as measured by the Gardner gloss metering unit at a temperature of about 126° C. The oil rate utilized was about 12 milligrams per sheet of paper. The fusing latitude of the comparative toner of this Example was 10° C. less than the toner of Example VIII wherein the toner contains an amidosiloxane moiety chemically linked to the polyester.

Other embodiments and modifications of the present invention may occur to those skilled in the art subsequent to a review of the information presented herein; these embodiments and modifications, as well as equivalents thereof, are also included within the scope of this invention.

What is claimed is:

1. A toner composition consisting essentially of particles with pigment, an optional charge enhancing additive and a polyesteramide-siloxane resin of the following Formulas I, II or III

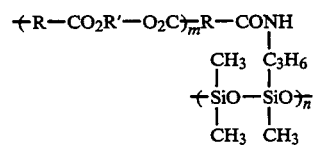

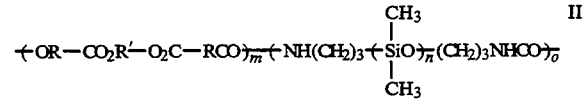

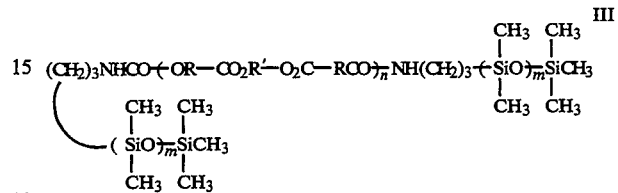

wherein m, n and o represent the number of monomer segments present; R is independently selected from the group consisting of arylene and alkylene; and R' is independently selected from the group consisting of alkylene and oxyalkylene; and wherein n is a number of from about 10 to about 1,000; m is a number of from about 10 to about 1,000; and o is a number of from about 10 to about 1,000.

2. A toner in accordance with claim 1 which possesses a low fixing temperature of from about 120° C. to about 145° C. and a broad fusing latitude of from about 40° C. to about 120° C.

3. A toner in accordance with claim 1 wherein R' is alkylene with from 1 to about 25 carbon atoms.

4. A toner in accordance with claim 1 wherein R is selected from the group consisting of phenylene, terephthalylene, isophthalylene, phthalylene, xylylene, 1,4-cyclohexylene, 1,3-cyclohexylene, 1,2-cyclohexylene, 1,4-naphthylene, 1,7-naphthylene, 1,6-naphthylene, 1,3 naphthylene, 1,2-naphthylene, 1,8-naphthylene, biphenylene, methylene, ethylene, propylene, butylene, pentylene, hexylene, heptylene, octylene, nonylene, decylene, undecylene, dodecylene, and stearylene.

5. A toner in accordance with claim 1 wherein R' is methylene, ethylene, propylene, butylene, pentylene, hexylene, heptylene, octylene, nonylene, decylene, undecylene, stearylene, neopentylene, 1,2-propylene, 1,2-butylene, 1,3-butylene, 2-pentylene 2,2-dimethylpentylene, ethyleneoxide, propyleneoxide, or diethyleneoxide.

6. A toner in accordance with claim 1 with a low relative humidity rate ratio of from about 1 to about 2.5.

7. A toner in accordance with claim 1 wherein the polyesteramide-siloxane is selected from the group consisting of copoly(1,2-propylene-diethylene-terephthalate)-copoly-(3'-aminopropylsiloxane), copoly(1,2-propylene-terephthalate)-copoly-(3'-aminopropylsiloxane), copoly(1,2-propylene-ethylene-terephthalate)-copoly-(3'-aminopropylsiloxane), copoly(1,2-propylene-diethyleneterephthalate)-copoly-(3'-aminopropylsiloxane, copoly-(1,2-propylenebisphenol A-fumarate)-copoly-(3'aminopropylsiloxane), copoly(1,2-propylene-1,4-cyclohexane-terephthalate)-copoly-(3'-aminopropylsiloxane), copoly(1,2-propylene-1,4-cyclohexanedimethanol-terephthalate)-copoly-(3'-aminopropylsiloxane), poly((1,2-propylene-diethylene-terephthalate)-g-γ-amidosiloxane, poly(1,2-propylene-ethylene-terephthalate)-g-γ-amidosiloxane, poly(1,2-propylene-hexylene-terephthalate)-g-γ-amidosiloxane, poly(1,2-propylene-1,4-cyclohexane-terephthalate)-g-γ-amidosiloxane, poly(1,2-propylene-bisphenol A-fumarate)-g-γ-amidosiloxane, bis(3-amidopropylsiloxy)-poly(1,2-propylene-ethylene-terephthalate), bis(3-amidopropylsiloxy)-poly(1,2-propyleneterephthalate), bis(3-amidopropylsiloxy)-poly(1,2-propylene-diethyleneterephthalate), and bis(3-amidopropylsiloxy)-poly(1,2-propylene-bisphenol A-fumarate).

8. A toner in accordance with claim 1 wherein the polyesteramide-siloxane has a $M_n$ of from about 1,500 to about 200,000, and an $M_w$ of from about 2,500 to about 300,000.

9. A toner composition in accordance with claim 1 with a glass transition temperature thereof of from about 50° C. to about 65° C.

10. A toner composition in accordance with claim 1 wherein a charge enhancing additive is incorporated into the toner particles, or is present on the surface of the toner.

11. A toner composition in accordance with claim 1 wherein the pigment is carbon black, magnetites, or mixtures thereof, cyan, magenta, yellow, red, blue, green, brown, or mixtures thereof.

12. A toner in accordance with claim 1 wherein the charge additive is a quaternary ammonium compound.

13. A toner in accordance with claim 1 wherein the charge additive functions to charge the toner positively, or the charge additive functions to charge the toner negatively; and which additive is present in an amount of from about 0.1 to about 10 weight percent based on the weight of the toner components.

14. A toner in accordance with claim 1 wherein the charge additive is an alkylpyridinium halide, distearyl dimethyl ammonium methyl sulfate, or mixtures thereof.

15. A toner composition in accordance with claim 1 wherein the pigment is present in an amount of from about 1 to about 20 weight percent.

16. Toner particles consisting essentially of pigment, an optional charge enhancing additive and a polyesteramidesiloxane resin of the following Formulas I, II or III

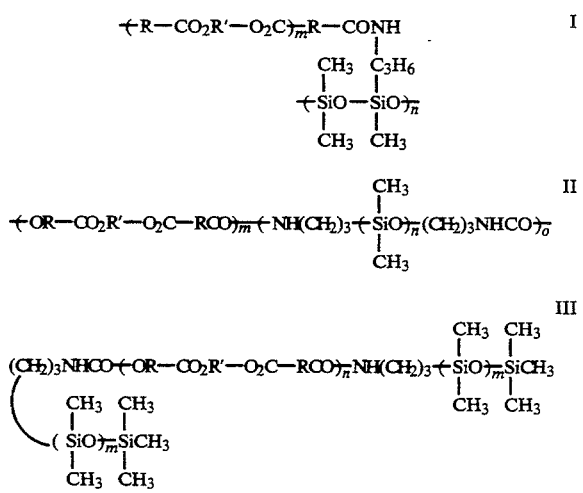

wherein m, n and o represent the number of monomer segments present; R is independently selected from the group consisting of arylene and alkylene; and R' is independently selected from the group consisting of alkylene and oxyalkylene; and wherein n is a number of from about 10 to about 1,000; m is a number of from about 10 to about 1,000; and o is a number of from about 10 to about 1,000.

17. A developer composition consisting essentially of a toner composition consisting essentially of particles, of pigment, an optional charge enhancing additive and a polyesteramide-siloxane resin of the following Formulas I, II or III

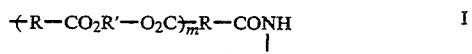
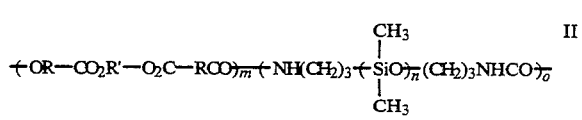
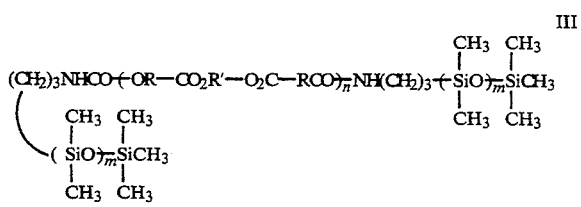

wherein m, n and o represent the number of monomer segments present; R is independently selected from the group consisting of arylene and alkylene; and R' is independently selected from the group consisting of alkylene and oxyalkylene; and wherein n is a number of from about 10 to about 1,000; m is a number of from about 10 to about 1,000; and o is a number of from about 10 to about 1,000, and carrier particles.

18. A developer composition in accordance with claim 17 wherein the carrier particles are comprised of ferrites, steel, or an iron powder with an optional coating, or mixture of coatings thereover.

19. A method of imaging which consisting essentially of formulating an electrostatic latent image on a negatively charged photoconductive imaging member, affecting development thereof with a toner composition consisting essentially of particles, of pigment, an optional charge enhancing additive and a polyesteramide-siloxane resin of the following Formulas I, II or III

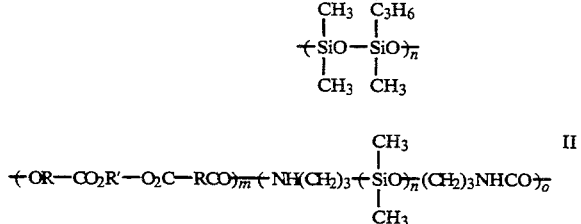

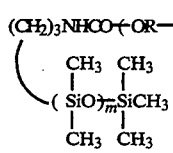

wherein m, n and o represent the number of monomer segments present; R is independently selected from the group consisting of arylene and alkylene; and R' is independently selected from the group consisting of alkylene and oxyalkylene; and wherein n is a number of from about 10 to about 1,000; m is a number of from about 10 to about 1,000; and o is a number of from about 10 to about 1,000, and thereafter transferring the developed image to a suitable substrate.

* * * * *